Figure 1:
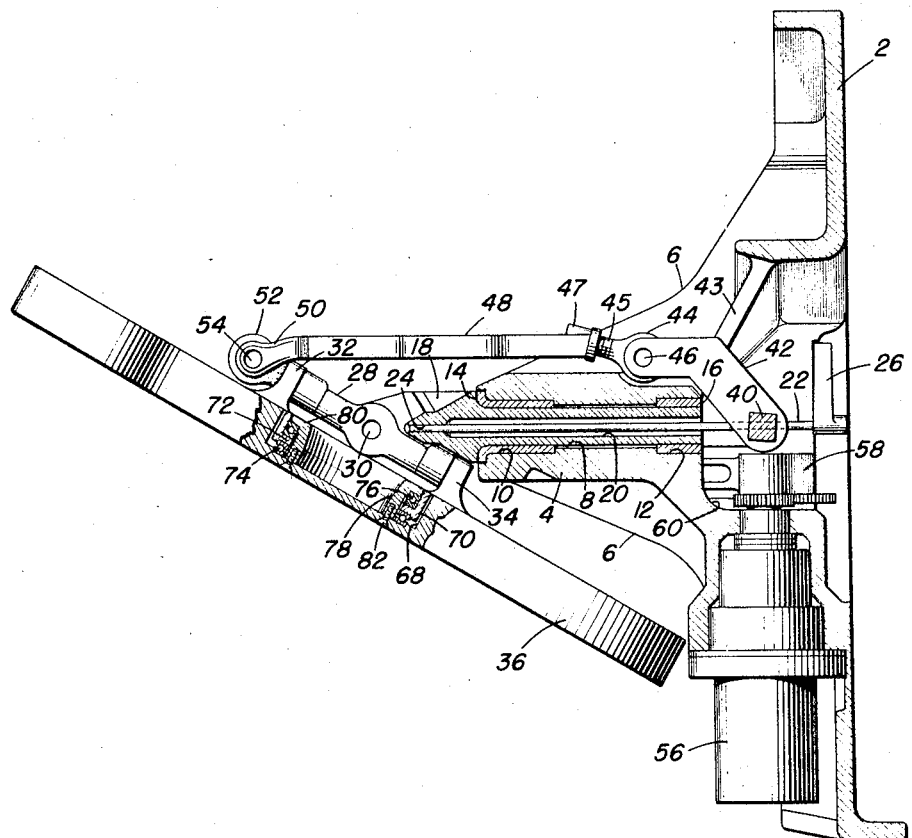

Jan. 3, 1967  R. H. LAPP  3,296,621
TORSIONALLY DECOUPLED ANTENNA SUPPORT
Filed Oct. 11, 1963  2 Sheets-Sheet 1

ROGER H. LAPP
INVENTOR

BY Claude Funkhouser
ATTORNEY

United States Patent Office 3,296,621
Patented Jan. 3, 1967

3,296,621
TORSIONALLY DECOUPLED ANTENNA SUPPORT
Roger H. Lapp, Silver Spring, Md., assignor to the United States of America as represented by the Secretary of the Navy
Filed Oct. 11, 1963, Ser. No. 315,729
1 Claim. (Cl. 343—765)

This invention relates generally to radar antenna positioning devices, and more particularly to an improved push rod actuated torsionally decoupled antenna support.

This invention is an improvement over the invention disclosed in application Serial No. 309,359 filed September 16, 1963, of George E. Moul, Jr., entitled, Two Rod Seeker Head. In that disclosure an antenna positioning device for use with airborne search radars is described, and includes a supporting base upon which is pivotally attached a pair of push rods. The push rods are each movable in a single plane, the plane of movement of one rod being displaced 90 degrees from the plane of movement of the other rod. The rods are each driven by an electric motor and gear reduction unit operating through a lever arm, and a pair of linear potentiometers are mounted on the base and are arranged to precisely measure the positions of the two arms.

One push rod is pivotally attached to a cross bar which, in turn, is pivotally attached at its opposite ends to the rear face of an antenna element and medially thereof to a supporting post projecting from the base. The other rod is attached through a universal coupling to a swivel plate which is itself attached to the rear of the antenna. The cross bar and the swivel plate each have a rate gyro thereon for detecting rotational rate of change in position of the two planes in which the push rods move. The push rods are actuated by their respective driving motors to thereby position the antenna element whereever desired within its operating range.

The positioning device of the previous disclosure operates satisfactorily under most conditions. However, in certain missiles a condition arises which renders rate gyros on that device, or any other known positioning device, nearly inoperative. In those missiles the method of steering the vehicle causes the airframe to oscillate very rapidly in a rolling motion about its longitudinal axis. While the total angular travel during such rolling motion is small, the continuous movement is transmitted through the airframe and acts upon the positioning device in such a manner as to saturate the gyroscopes mounted on the antenna. Thus, the oscillatory torsional motion tends to destroy the effectiveness of the search radar.

It is an object of this invention to provide an antenna positioning device so constructed as to be torsionally decoupled from the missile airframe upon which it is mounted.

Figure 2:
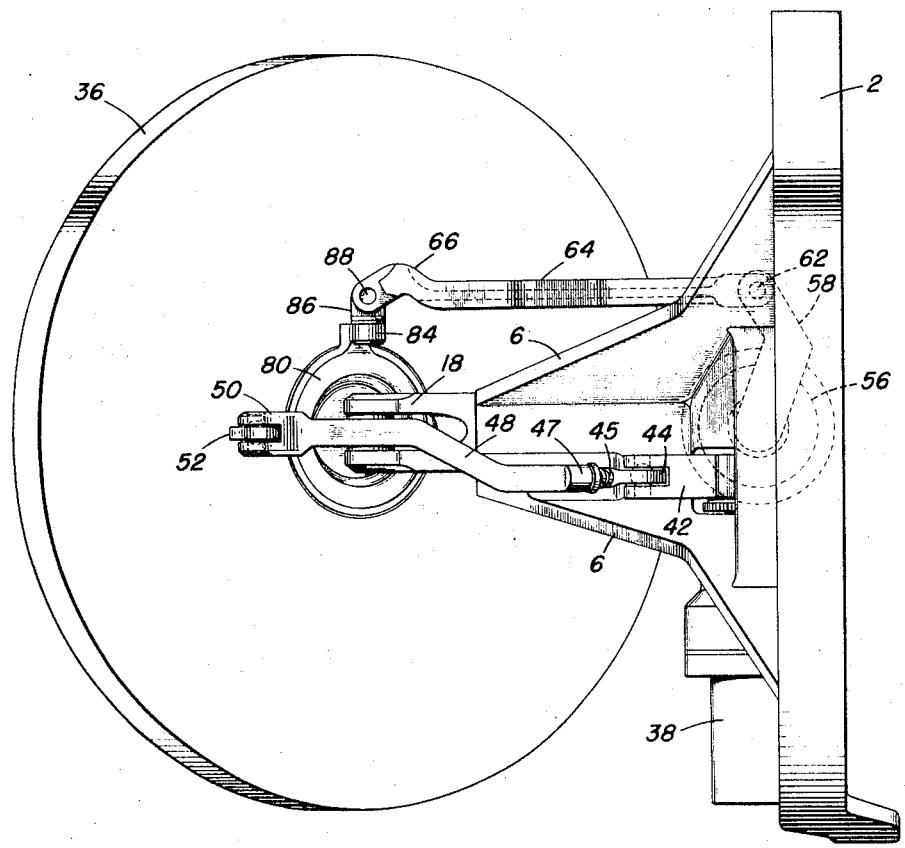

Other objects and many of the attendant advantages of this invention will be readily appreciated as the same becomes better understood by reference to the following detailed description when considered in connection with the accompanying drawings, wherein:

FIG. 1 is an axial section of the antenna positioning device of the invention; and FIG. 2 is a top plan view of the device of FIG. 1.

The antenna positioning device of the present invention is actuated by link structure including two push rods in substantially the same manner as is the device disclosed in the above-identified earlier filed patent application, and comprises a base from which projects a support post having a cylindrical bore therein. A yoke is mounted within said bore for easy rotation, and is secured in position by a torsion rod. The end of the yoke is secured to an axle which is itself pivotally secured to the back of an antenna element. A first push rod is attached to the base at one end and is pivotally secured to the axle mounted on the antenna, and a second push rod is mounted on the base and is connected with a centrally-positioned swivel plate mounted in the antenna.

The first push rod is designed to be rockable in two planes, and the second to be flexible in one plane, the two push rods cooperating with the torsion bar-restrained, rotatably-mounted yoke to decouple the antenna element from torsional movements of the airframe to which the base is attached.

Referring now to the drawings, a supporting base is shown at 2, and has an integral support post 4 extending normally therefrom and reinforced by web 6. The base 2 is normally secured to an airframe (not shown) symmetrically about the axis thereof. The post has a central bore 8 therethrough, which has near its forward end an enlarged portion 10 and at its rear end an enlarged portion 12. The portion 10 has a flanged bushing 14 disposed therein, whereas the portion 12 has a sleeve bushing 16 disposed within it.

Received within the bushings 14 and 16 is the cylindrical shank of a yoke 18, said shank having a cylindrical bore 20 therein. A torsion rod 22 is disposed within said bore 20, and is secured, as by welding, within a socket 24 in the yoke. The opposite end of the rod 22 is secured by a clamp 26 mounted on the aft end of the supporting base 2.

As is best shown in FIG. 2, the end of yoke 18 is bifurcated. The yoke 18 receives an axle 28 (FIG. 1) which is pivoted thereto by a pin 30. The opposite ends of the axle 28 are mounted within a pair of trunnions 32 and 34 attached to the back of an antenna element 36. The antenna element 36 is mounted by the trunnions 32 and 34 for pivotal movement about the axle 28.

A motor 38 is mounted on the front of the base 2, and has a rectangular shaft 40 to which is attached the lower end of a crank arm 42. The arm 42 extends through an opening 43 in the base 2, and the upper end thereof is bifurcated for receiving a spherical bearing 44, which eye is pivotally secured by a pin 46. The spherical bearing 44 has a threaded shank 45 which is received within a collar 47 attached to one end of a push rod 48.

The push rod 48 is substantially square in cross section and, as best seen in FIG. 2, has a reverse bend therein whereby to align its outer end portion 50 with the central axis of the antenna. The end portion 50 is bifurcated and receives a sperical bearing 52 which forms an extension of the axle 28, the two elements being connected by a pin 54. The arm 48 is thus mounted for swiveling movement relative to the antenna 36.

A second drive motor 56, disposed at 90 degrees to the motor 38, is mounted on the base 2, and drives a crank arm 58 (shown in broken lines in FIG. 2), the arm extending through an opening 60 in the base 2. The outer end portion of the arm 58 is bifurcated and is connected by a pin 62 to one of a push rod 64. The push rod 64 is substantially of I configuration in cross-section and has a reverse bend therein, whereby to bring its forward end 66 into a plane disposed at right angles to a plane containing the forward end portion 50 of the rod 48.

The antenna element 36 has a central, cup-shaped opening 68 therein, within which is received an annular swivel disk 70 having an inturned flange 72 thereon. A pair of bearing units 74 and 76 are disposed on either side of flange 72, and the entire assembly is secured in place by a keeper ring 78. The keeper ring has an out-turned flange 80 thereon, which engages bearing unit 76, and is secured to the antenna by a plurality of screws 82.

The disk 70 has a trunnion 84 (FIG. 2) formed thereon, within which is swiveled an eye 86. The eye 86 is received within the bifurcated end portion 66 of the push rod 64, where it is secured by a pin 88.

The manner in which the push rods 48 and 64 function to position the antenna element is as follows. Assume first that the antenna element 36 is in a neutral position, i.e., perpendicular to the central axis of the post 4. To tilt it forward, the motor 38 is actuated for moving the crank arm 42 and the push rod 48; this action causes the antenna to pivot about the pins 54 and 30. If it is desired instead to pivot the antenna about the axle 28, the push rod 64 is actuated through the lever arm 58 by the motor 56. Movement of the antenna about both pivotal axes simultaneously is accomplished by actuating both the motors 38 and 56, the swivel disk 70 and eye 86 then functioning to prevent binding of the antenna.

When the base 2 is subjected to torsional oscillations about the central axis of the post 4, the following occurs: The arm 64 will flex slightly, but only in the horizontal plane. The arm 48 will rock in its spherical bearings. The end portions of the arms will thus transmit none of the torsional oscillating force to the antenna element. It is possible to utilize this flexing and rocking action of the arms 48 and 64 to such an extent that the end portions 50 and 66 of said arms move little, if any, during the torsional oscillations of the base.

It will be understood from the foregoing description that the antenna 36 is provided with a central support by the post 4 and the yoke 18 and is permitted elevational and azimuthal movement by the linkage structure above described. The thin torsion rod 22, which is under considerable tension, functions to hold said yoke firmly in place on the base 2, so that no axial motion can occur between the two, and no appreciable coupling of torsional vibrations between the antenna element 36 and the base 2 will occur.

Obviously, many modifications and variations of the present invention are possible in the light of the above teachings. It is, therefore, to be understood that within the scope of the appended claim the invention may be practiced otherwise than as specifically described.

What is claimed is:

A torsionally decoupled antenna support, comprising
a supporting base having a support post thereon,
a yoke,
a torsion rod secured to the base and to the yoke,
an antenna element,
means pivotally connecting the antenna element to the yoke,
a first push rod connected to said means and operable for moving the antenna element about one axis on said yoke, and
a second push rod connected to said means for moving the antenna element about another axis on said yoke,
said first push rod including spherical bearings connecting it to the means and said second push rod being slightly flexible,
said push rods cooperating with said torsion rod for torsionally decoupling said antenna element from said base, whereby said antenna element will be isolated from vibrations imparted to the base.

References Cited by the Examiner

UNITED STATES PATENTS

| | | | |
|---|---|---|---|
| 2,491,229 | 12/1949 | Taylor. | |
| 2,572,919 | 10/1951 | French et al. | 88—36 X |
| 2,599,381 | 6/1952 | Gerks | 88—36 X |
| 2,733,437 | 1/1956 | Lyman et al. | 343—765 |
| 3,084,342 | 4/1963 | Fuller et al. | 343—765 |
| 3,166,750 | 1/1965 | Ball | 343—765 |

HERMAN KARL SAALBACH, *Primary Examiner.*

E. LIEBERMAN, A. R. MORGANSTERN, M. NUSSBAUM, *Assistant Examiners.*